C. E. HATFIELD.
WIRE SPLICE AND STRETCHER.
APPLICATION FILED DEC. 22, 1920.
1,386,109.
Patented Aug. 2, 1921.
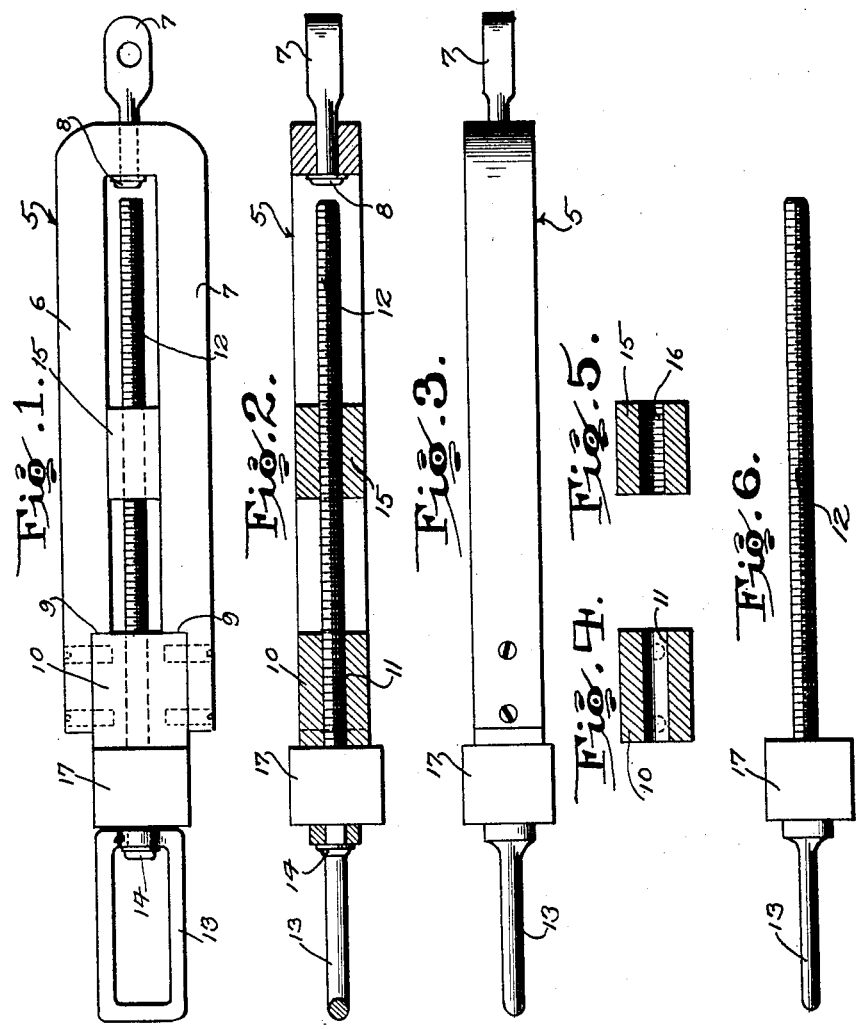
C. E. Hatfield.
INVENTOR.
BY
Watson E. Coleman
ATTORNEY.

UNITED STATES PATENT OFFICE.

CHRISTIAN E. HATFIELD, OF FLORENCE, OKLAHOMA.

WIRE SPLICE AND STRETCHER.

1,386,109.  Specification of Letters Patent.  Patented Aug. 2, 1921.

Application filed December 22, 1920. Serial No. 432,554.

*To all whom it may concern:*

Be it known that I, CHRISTIAN E. HATFIELD, a citizen of the United States, residing at Florence, in the county of Grant and State of Oklahoma, have invented certain new and useful Improvements in Wire Splices and Stretchers, of which the following is a specification, reference being had to the accompanying drawings.

This invention relates to a wire splice and stretcher and has for its object to provide a device of this character capable of being readily connected to the ends of two lengths of wire and rotated to either stretch the wire, or serve as splicing means.

Another object is to provide a device of this character which is simple and compact in form so that it may be retained by the wire to form a portion thereof in the completion of the stretching or splicing operation.

A still further object of the invention is to provide a device of this character capable of being operated by a conventional form of wrench.

With the above and other objects in view, the invention consists in the improved construction and arrangement of parts to be hereinafter more particularly described, fully claimed and illustrated in the accompanying drawings; wherein:—

Figure 1 is a plan view of a wire splice and stretcher constructed in accordance with an embodiment of the invention, Fig. 2 is a longitudinal sectional view, Fig. 3 is a side elevation, Fig. 4 is a detail view of the bearing block, Fig. 5 is a detail view of the nut, and Fig. 6 is a side elevation of the rod.

Referring to the drawings, 5 designates a yoke member including arms 6, said yoke member having an opening formed in its bight portion in which a connecting member or swivel 7 is freely mounted, the connecting member being retained in connection with the yoke by means of the nut 8. With this novel connecting member or swivel, the yoke is free to adjust itself in the operation of the device.

The inner end portion of each of the arms 6 is reduced, to provide a shoulder 9, said shoulder being adapted to engage a bearing block 10 which is disposed between the arms 6 and serves to close the open end of the yoke. This bearing block is firmly secured between the arms and is provided with a smooth bore or opening 11.

The bearing block 10 is arranged to movably support a rod 12 which is threaded, the rod being freely disposed in the opening 11 as the opening is not threaded. One end of the rod 12 is adapted to receive a connecting member or swivel 13 which is movable on the rod and prevented from disengagement by means of the nut 14. Disposed between the arms 6 is a nut 15, said nut having a threaded opening 16 adapted to receive the threaded portion of the rod 12. The nut 15 coincides with the arms 6 of the yoke member so that while the nut is movable longitudinally of the arms it cannot rotate, as the sides of the nut would prevent such movement by contact with the inner surface of the arms 6. In order to rotate the rod 12, an operating member or collar 17 is formed on the rod 12 adjacent the swivel 13, said member having many sides so that a wrench or like implement may be engaged therewith to rotate the rod.

In the operation of the device, one end of the wire to be tightened is secured to the swivel or connecting member 7 while the adjacent end of the severed portion of the wire is connected to the swivel 13. This application of the device to the wire is facilitated by rotating the rod 12 until the nut member 15 reaches the inner end of the rod before the device is applied to the wires. This permits the rod to be moved freely through the bearing block 10 and longitudinally of the yoke so that resistance is greatly reduced when applying the device. A wrench is then engaged with the member 17 and the rod rotated so as to permit the rod to move inwardly of the yoke and thereby draw the ends of the wire toward each other. If desired, after the stretching operation, the device can be left in the wire to form part thereof as it is compact in form and occupies a relatively small space.

From the foregoing it will be readily seen that this invention provides a novel form of wire splice and stretcher capable of being applied to any wire regardless of whether the wire has become loose or severed, and it will be found especially useful in connecting wires that extend over mounds or like elevations. Furthermore, the bearing block 10 relieves the nut 15 of a considerable portion of the strain, so that danger of the threads stripping is eliminated, and the nut 15 permitted to operate independently of the yoke. It is of course obvious that the device is not limited for use in connection with wire, but may be used under certain conditions as a jack. In addition to this it does not require any special or intricate mechanism to operate as a conventional form of wrench is all that is necessary.

It is obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

What is claimed is:—

1. A device of the character described comprising a yoke including spaced parallel arms, a bearing member disposed between and connecting the ends of the arms, one end of said block projecting beyond the end of the yoke to provide an abutment, said bearing member having a smooth bore, a rod freely mounted in the bearing member, a nut movable between the arms of the yoke on the rod, and means for rotating said rod, said means being arranged to engage the abutment.

2. A device of the character described comprising a yoke, a bearing member carried by and closing one end of the yoke, a threaded rod slidably and rotatably movable through said bearing member, and a block having a threaded opening, said rod being rotatable in said opening, said block being slidable longitudinally of the yoke, between the arms with the rod.

3. A device of the character described comprising a yoke, a bearing member carried by and closing one end of the yoke, a threaded rod freely movable through said bearing member, a block having a threaded opening, said rod being rotatable in said opening, said block being slidable longitudinally of the yoke, between the arms, and a many sided collar carried by the end of the rod, whereby the rod is rotated through the medium of a suitable implement engaged with the collar.

In testimony whereof I hereunto affix my signature.

CHRISTIAN E. HATFIELD.